(12) United States Patent
Shibata (10) Patent No.: US 11,999,286 B2
(45) Date of Patent: Jun. 4, 2024

(54) VEHICLE DRAWING DEVICE

(71) Applicant: KOITO MANUFACTURING CO., LTD., Tokyo (JP)

(72) Inventor: Yuichi Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 188 days.

(21) Appl. No.: 17/640,436

(22) PCT Filed: Aug. 11, 2020

(86) PCT No.: PCT/JP2020/030562
§ 371 (c)(1),
(2) Date: Mar. 4, 2022

(87) PCT Pub. No.: WO2021/049232
PCT Pub. Date: Mar. 18, 2021

(65) Prior Publication Data
US 2022/0341560 A1     Oct. 27, 2022

(30) Foreign Application Priority Data

Sep. 9, 2019   (JP) ................................ 2019-163835

(51) Int. Cl.
*B60Q 1/38*           (2006.01)
(52) U.S. Cl.
CPC .............. *B60Q 1/38* (2013.01); *B60Q 1/381* (2022.05); *B60Q 2400/50* (2013.01)
(58) Field of Classification Search
CPC ....................................................... B60Q 1/38
See application file for complete search history.

(56) References Cited

U.S. PATENT DOCUMENTS

2020/0172005 A1 *   6/2020   Hartmann .............. B60Q 1/488

FOREIGN PATENT DOCUMENTS

| EP | 3178698 | A1 * | 6/2017 | ............... B60Q 1/22 |
|----|---------|------|--------|---------|
| EP | 3178698 | A1   | 6/2017 | |
| EP | 3213951 | A1   | 9/2017 | |
| GB | 2517790 | A    | 3/2015 | |
| JP | 2002-015709 | A | 1/2002 | |
| JP | 2005-329819 | A | 12/2005 | |
| JP | 2016-193689 | A | 11/2016 | |
| JP | 2018-177044 | A | 11/2018 | |
| WO | 2016/114048 | A1 | 7/2016 | |
| WO | 2017/138150 | A1 | 8/2017 | |
| WO | 2018/138842 | A1 | 8/2018 | |
| WO | 2018/187823 | A2 | 10/2018 | |

OTHER PUBLICATIONS

International Search Report dated Oct. 20, 2020 for WO 2021/049232 A1 (6 pages).
An Extended European Search Report dated Oct. 4, 2022, issued from the European Patent Office (EPO) of European Patent Application No. 20864018.5 (8 pages).

* cited by examiner

*Primary Examiner* — Travis R Hunnings
(74) *Attorney, Agent, or Firm* — Venjuris, P.C.

(57) ABSTRACT

A vehicle drawing device draws a sign on a road surface with amber-colored light. When a luminance of the sign is assumed as a road surface drawing luminance, and a luminance in a surrounding environment of a driving vehicle is assumed as a background luminance, the amber-colored light is irradiated such that a luminance contrast calculated by the road surface drawing luminance and the background luminance is 0.2 or more.

7 Claims, 4 Drawing Sheets

VEHICLE DRAWING DEVICE

CROSS REFERENCE TO RELATED APPLICATIONS

This application is a national phase of PCT application No. PCT/JP2020/030562, filed on 11 Aug. 2020, which claims priority from Japanese patent application No. 2019-163835, filed on 9 Sep. 2019, all of which are incorporated herein by reference.

TECHNICAL FIELD

The present disclosure relates to a technical field of a vehicle drawing device that draws a predetermined sign on a road surface.

BACKGROUND

A vehicle is provided with various vehicle lamps that function as marker lamps, such as, for example, a turn signal lamp, a stop lamp, and a tail lamp. By irradiating light from these vehicle lamps, it becomes easier for passengers of other vehicles or pedestrians to recognize the driving state or driving direction of the vehicle, so that an alerting function is exerted to the passengers of other vehicles or the pedestrians.

Meanwhile, in addition to the vehicle lamps that function as the marker lamps as described above, a vehicle may include a vehicle drawing device that draws information related to the operation of the own vehicle such as, for example, information related to the traveling direction when making a left turn or a right turn, on the road surface (see, e.g., Patent Document 1).

PRIOR ART DOCUMENT

Patent Document

Patent Document 1: Japanese Patent Laid-Open Publication No. 2016-193689

SUMMARY OF THE INVENTION

Problem to be Solved

However, in the vehicle drawing device as described above, it may be desirable that good visibility of the sign drawn on the road surface is secured, and the alerting function is exerted to passengers of other vehicles or pedestrians, so that the safety is improved.

In particular, in the time band immediately before the sunset, which is dim, the background luminance in the surrounding environment of the vehicle is approximately 800 lux, and it is considered to be the most difficult time band to recognize the presence of the driving vehicle. Therefore, it is desirable that a high alerting function is exerted to passengers of other vehicles or pedestrians even in this time band.

Therefore, the present disclosure is to improve the visibility of the sign drawn on the road surface to exert a high alerting function to passengers of other vehicles or pedestrians.

Means to Solve the Problem

First, a vehicle drawing device according to the present disclosure is configured to draw a sign on a road surface with amber-colored light. When a luminance of the sign is assumed as a road surface drawing luminance, and a luminance in a surrounding environment of a driving vehicle is assumed as a background luminance, the amber-colored light is irradiated such that a luminance contrast calculated by the road surface drawing luminance and the background luminance is 0.2 or more.

Therefore, the luminance contrast of the road surface drawing luminance with respect to the background luminance is increased.

Second, in the vehicle drawing device according to the present disclosure described above, an ON/OFF of the vehicle drawing device may be performed at the same timing as an ON/OFF of a turn signal lamp.

Therefore, the ON/OFF of the vehicle drawing device is performed at the same timing as the ON/OFF of the turn signal lamp.

Third, in the vehicle drawing device according to the present disclosure described above, the amber-colored light may be irradiated such that the luminance contrast is less than 1.0.

Therefore, the luminance contrast has a value below a certain level, and thus, the amount of light irradiated from the vehicle drawing device toward the road surface is decreased.

Fourth, a vehicle drawing device according to another aspect of the present disclosure is configured to draw a sign on a road surface with amber-colored light. A maximum luminous intensity in a light distribution pattern of light irradiated from the vehicle drawing device is three times or more of a maximum luminous intensity in a light distribution pattern of light irradiated from a turn signal lamp.

Therefore, it is possible to increase the luminance contrast of the road surface drawing luminance with respect to the background luminance.

Fifth, in the vehicle drawing device according to another aspect of the present disclosure, an ON/OFF of the vehicle drawing device may be performed at a same timing as an ON/OFF of the turn signal lamp.

Therefore, the ON/OFF of the vehicle drawing device is performed at the same timing as the ON/OFF of the turn signal lamp.

Sixth, in the vehicle drawing device according to another aspect of the present disclosure, a plurality of signs may be drawn, and a maximum luminous intensity in a light distribution pattern of light that draws at least one sign among lights that draw the plurality of signs may be three times or more of the maximum luminous intensity in the light distribution pattern of the light irradiated from the turn signal lamp.

Therefore, it is possible to increase the luminance contrast of the road surface drawing luminance with respect to the background luminance in at least one sign.

Effect of the Invention

According to the present disclosure, since the luminance contrast of the road surface drawing luminance with respect to the background luminance is increased, the visibility of the sign drawn on the road surface may be improved, and a high alerting function may be exerted to passengers of other vehicles or pedestrians.

DETAILED DESCRIPTION TO EXECUTE THE INVENTION

Hereinafter, an embodiment for implementing a vehicle drawing device of the present disclosure will be described with reference to the accompanying drawings.

[Configuration of Vehicle Drawing Device and Vehicle Lamp]

First, configurations of a vehicle drawing device 1 and a vehicle lamp 20 provided in a vehicle 100 will be described (see FIGS. 1 to 4).

Figure 1:
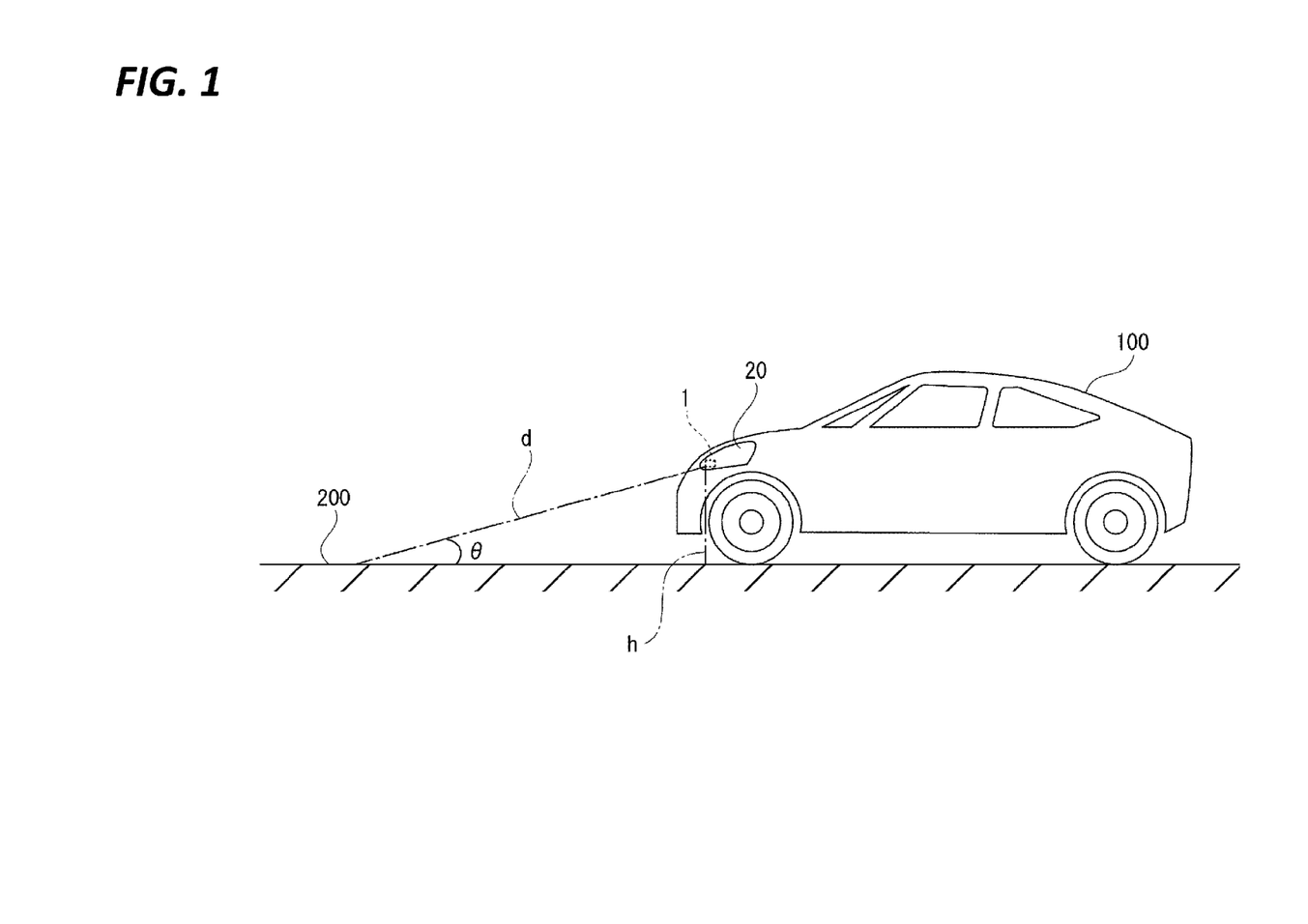
FIG. 1 illustrates an embodiment of a vehicle drawing device of the present disclosure together with FIGS. 2 to 6, and is a side view illustrating the vehicle drawing device.

The vehicle drawing device 1 is provided, for example, as a drawing unit together with a lamp unit for a turn signal lamp inside the vehicle lamp 20 that is mounted and arranged at each of the left and right ends of the front end portion of the vehicle 100 (see FIG. 1). The vehicle drawing device 1 may be mounted and arranged at each of the left and right ends of the front end portion of the vehicle 100 separately from the vehicle lamp 20.

For example, in the vehicle 100, the vehicle drawing device 1 is configured to irradiate light from a mounting position at a height h toward a road surface 200, and an angle between the irradiation position at an irradiation distance d on the optical axis and the road surface 200 is set to 0. Amber-colored light is irradiated from the vehicle drawing device 1 toward the road surface 200, and the main wavelength of the amber-colored light is 580 nm to 600 nm.

Further, in the vehicle 100, amber-colored light is irradiated from the vehicle lamp 20 as light of the turn signal lamp, and the main wavelength of the amber-colored light of the turn signal lamp is also 580 nm to 600 nm. The light of the turn signal lamp is irradiated in a flickering state where light is turned on/off repeatedly at regular intervals, or in a sequential state where a plurality of light sources is turned on sequentially with a time difference and all the light sources are turned off at the same time.

Figure 2:
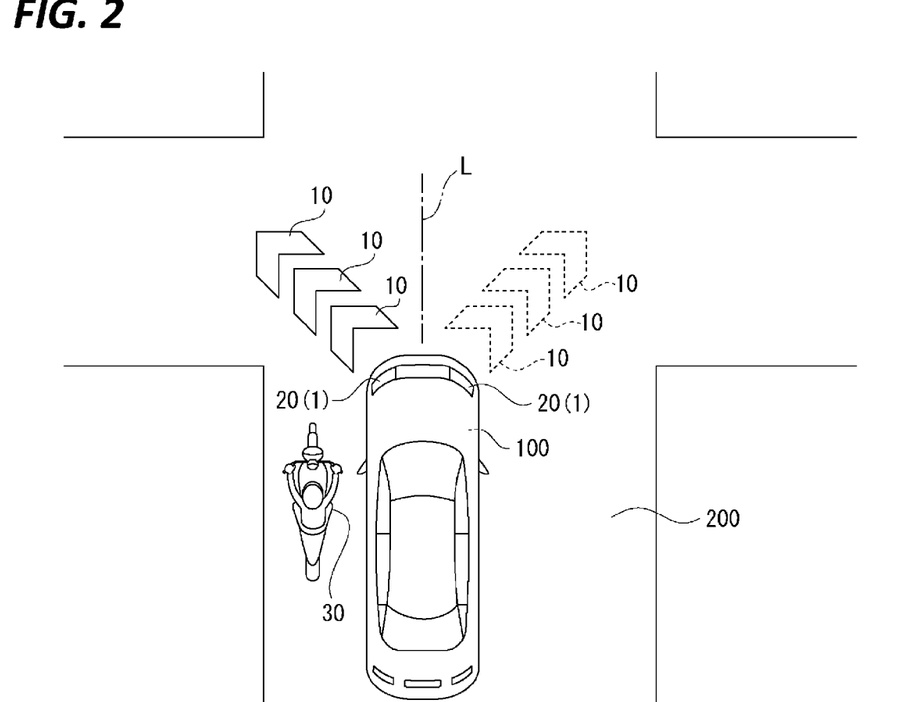
FIG. 2 is a plan view illustrating an example in which a sign is drawn when a two-wheeled vehicle is present on the side.
Figure 3:
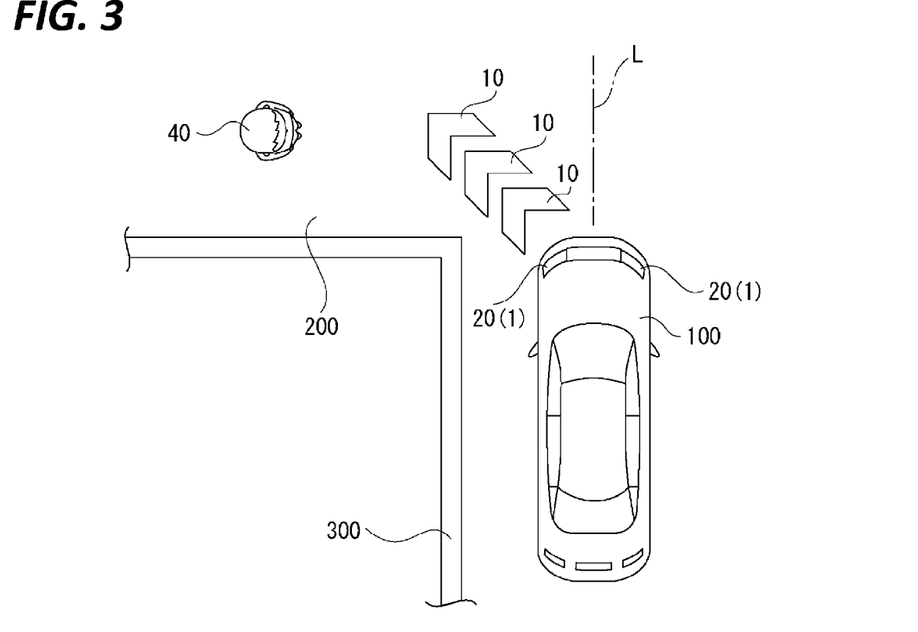
FIG. 3 is a plan view illustrating an example in which a sign is drawn when a pedestrian is present at a position screened by a shield.

Signs 10, 10, . . . are drawn on the road surface 200 by light irradiated from the vehicle drawing devices 1 (see FIGS. 2 and 3). Light is irradiated from the vehicle drawing device 1 on the left side toward the left side direction inclined to the front, so that the signs 10, 10, . . . are drawn at positions on the road surface 200 in the left side direction inclined to the front with reference to a center line L in the left-right direction of the vehicle 100. Light is irradiated from the vehicle drawing device 1 on the right side toward the right side direction inclined to the front, so that the signs 10, 10, . . . are drawn at positions on the road surface 200 in the right side direction inclined to the front with reference to the center line L in the left-right direction of the vehicle 100.

In the vehicle drawing device 1, both the signs 10, 10, . . . on the left side and the signs 10, 10, . . . on the right side are not drawn at the same time. However, in FIG. 2, for convenience of understanding, both the signs 10, 10, . . . on the left side and the signs 10, 10, . . . on the right side are illustrated by solid lines and broken lines.

The number of signs 10 drawn on the road surface 200 by light irradiated from the vehicle drawing device 1 may be one, or a plurality of signs 10 may be arranged side by side. The irradiation of the light that draws the sign 10 is started, for example, at the same timing as the start of the light irradiated from the turn signal lamp. Therefore, the sign 10 is drawn on the road surface 200 when the vehicle 100 makes a left turn or a right turn at an intersection or a corner. When light is irradiated from the turn signal lamp when making a left turn, light is irradiated from the vehicle drawing device 1 on the left side, and when light is irradiated from the turn signal lamp when making a right turn, light is irradiated from the vehicle drawing device 1 on the right side.

As described above, the start of the irradiation of the light that draws the sign 10 and the start of the light irradiated from the turn signal lamp are performed at the same timing, and the start of the irradiation of both lights is performed, for example, by operating a winker lever of the vehicle 100 by a driver.

Persons other than the passengers of the vehicle 100 such as passengers of other vehicles or pedestrians are urged to be alerted to the presence of the vehicle 100 or the traveling direction of the vehicle 100 by turning on the turn signal lamp, and further urged to be alerted to the presence of the vehicle 100 or the traveling direction of the vehicle 100 by the sign 10 drawn by the light irradiated from the vehicle drawing device 1.

Light is irradiated from the turn signal lamp in the traveling direction of the vehicle 100 or to the surroundings thereof, and the light irradiated from the turn signal lamp has a low function as light for irradiating the road surface 200. Meanwhile, since the sign 10 is drawn on the road surface 200 by the light irradiated from the vehicle drawing device 1, the function of the light irradiated from the turn signal lamp is supplemented by the light irradiated from the vehicle drawing device 1. In particular, the sign 10 is easy to see for pedestrians walking downward or forward inclined to the front or drivers of other vehicles driving downward or forward inclined to the front, and thus, the alerting function to the pedestrians may be further improved by the sign 10.

Further, for example, when a two-wheeled vehicle 30 such as a motorcycle or a bicycle is driving on the side of the vehicle 100 or tries to pass through the side of the vehicle 100, in a case where the driver of the vehicle 100 operates the winker lever with the intention of making a left turn, the flickering of the turn signal lamp is performed and the signs 10, 10, . . . are drawn at positions on the road surface 200 in the left side direction inclined to the front (see FIG. 2). Therefore, by drawing the signs 10, 10, . . . , the driver of the two-wheeled vehicle 30 recognizes the intention of making a left turn of the vehicle 100, and the driver of the two-wheeled vehicle 30 is urged to be alerted to the traveling direction of the vehicle 100. Therefore, an involvement accident of the two-wheeled vehicle 30 caused by the vehicle 100 or a collision accident between the two-wheeled vehicle 30 and the vehicle 100 may be prevented, and thus, the safety of both the passenger of the two-wheeled vehicle 30 and the passenger of the vehicle 100 may be improved.

Further, for example, when the driver of the vehicle 100 reaches a corner where the driver cannot recognize the presence of a pedestrian 40 or the driver of another vehicle due to a shield 300 such as a building or a wall, in a case where the driver of the vehicle 100 operates the winker lever with the intention of making a left turn or a right turn, the flickering of the turn signal lamp is performed and the signs 10, 10, . . . are drawn at positions on the road surface 200 in the left side direction inclined to the front or in the right side direction inclined to the front (see FIG. 3). Therefore, by drawing the signs 10, 10, . . . , the pedestrian 40 recognizes the presence of the driving vehicle 100 or the intention of making a left turn or a right turn of the vehicle 100 at the position screened by the shield 300, and the pedestrian 40 is urged to be alerted to the presence and the traveling direction of the vehicle 100. Therefore, a collision at the moment when the pedestrian 40 and the vehicle 100 encounter each other is prevented, and thus, the safety of both the pedestrian 40 and the passenger of the vehicle 100 may be improved.

Similarly to the turn signal lamp, light is irradiated in a flickering state or a sequential state from the vehicle drawing device 1. Therefore, when light is irradiated in the flickering state from the turn signal lamp, light may be irradiated in the flickering state or the sequential state from the vehicle drawing device 1, and when light is irradiated in the sequential state from the turn signal lamp, light may be irradiated in the flickering state or the sequential state from the vehicle drawing device 1.

However, when light is irradiated in the flickering state from both the vehicle drawing device 1 and the turn signal lamp, the timings of the ON/OFF may be the same with each other, and further, when light is irradiated in the sequential state from both the vehicle drawing device 1 and the turn signal lamp, the timings of the ON/OFF may be the same with each other. In this manner, in the case where light is irradiated in the same ON/OFF state from both the vehicle drawing device 1 and the turn signal lamp, the timings of the ON/OFF are the same with each other, and light is irradiated in conjunction with the vehicle drawing device 1 and the turn signal lamp. Therefore, both lights are easily recognized as light for alerting, and a high safety may be secured for passengers of other vehicles or pedestrians. When the light is irradiated in the flickering state, the flickering frequency is set to, for example, approximately 1 Hz to 2 Hz.

Further, the vehicle drawing device 1 may be turned on according to the relationship with the surrounding environment of the driving vehicle 100 or with other vehicle lamps. For example, when background luminance, which is luminance in the surrounding environment, is below a certain level of luminance during from evening to dawn, the vehicle drawing device 1 may be turned on, or when the vehicle 100 includes a daytime running lamp that irradiates the road surface during the daytime, the vehicle drawing device 1 may be turned on according to the OFF time of the daytime running lamp.

As described above, when the vehicle 100 makes a left turn or a right turn, light is irradiated from the turn signal lamp and light is irradiated from the vehicle drawing device 1. After the vehicle 100 makes a left turn or a right turn, the vehicle drawing device 1 is turned off prior to turning off the turn signal lamp. The turn signal lamp may be turned on for a certain time after making a left turn or a right turn due to the delay in the return of the steering wheel after the vehicle 100 makes a left turn or a right turn. However, when there is the sign 10 that is unnecessary after making a left turn or a right turn, there is a concern that causes misidentification to passengers of other vehicles. Therefore, by turning off the vehicle drawing device 1 prior to turning off the turn signal lamp after the vehicle 100 makes a left turn or a right turn as described above, it is possible to prevent the occurrence of misidentification to passengers of other vehicles.

When light is irradiated from the vehicle drawing device 1, as described above, the signs 10, 10, . . . are drawn at the positions on the road surface 200 in the lateral direction inclined to the front (left side direction inclined to the front or right side direction inclined to the front) with reference to the driving position of the vehicle 100, and the signs 10, 10, . . . are drawn, for example, in a state of being lined up in the irradiation direction (see FIGS. 2 and 3). The shape of the sign 10 drawn on the road surface 200 may be arbitrary as long as it is easy for passengers of other vehicles or pedestrians to assume the planned traveling direction of the vehicle 100. For example, the sign 10 may have a tapered shape in which at least the width of the tip end side portion decreases as it goes toward the planned traveling direction (see FIG. 4). As typical examples of such a shape include a shape in which two parallelograms are continued in a line-symmetrical state with reference to a light irradiation direction P (see the upper part of FIG. 4), a home-based shape (see the middle part of FIG. 4), or an arrow shape (see the lower part of FIG. 4). The reference numeral "FR" illustrated in FIG. 4 indicates a line indicating the front-rear direction of the vehicle 100.

Figure 4:
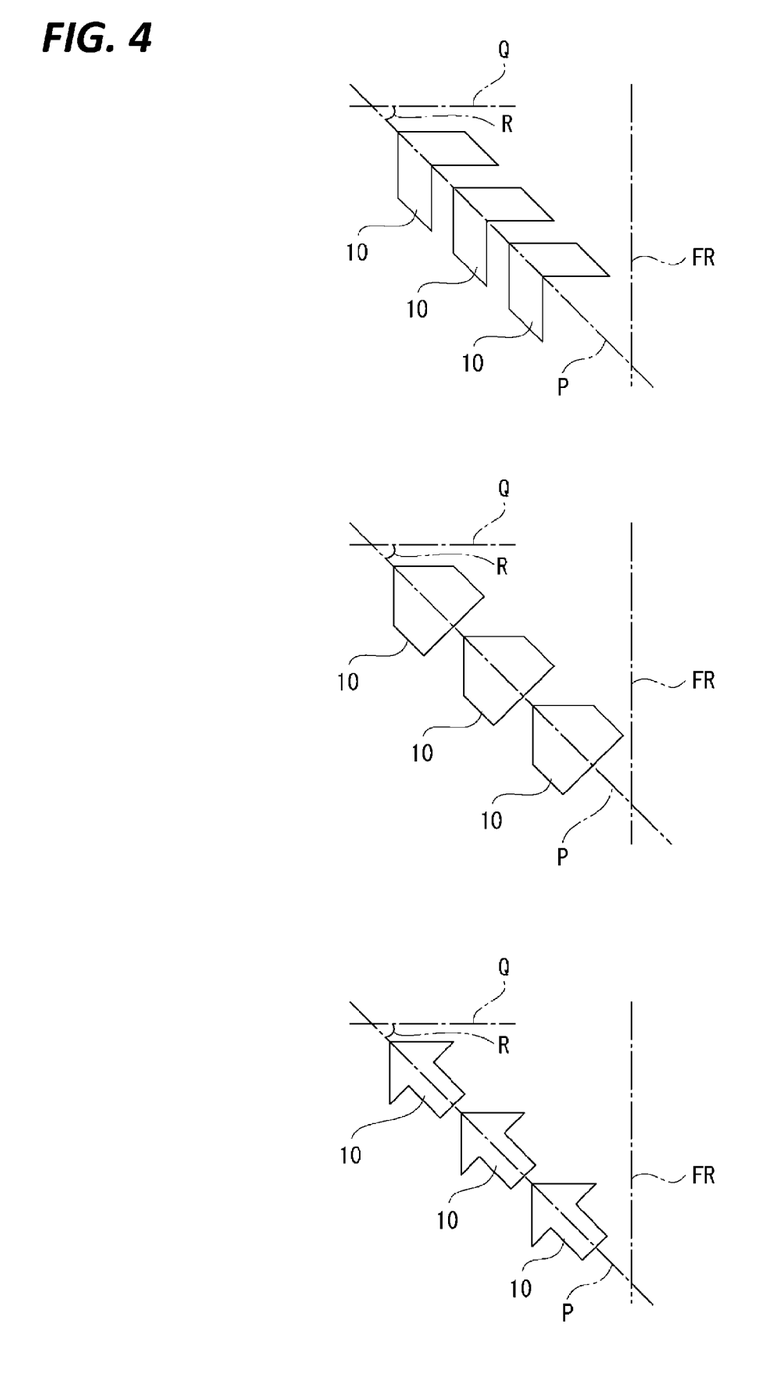
FIG. 4 is a plan view illustrating examples of a sign shape.

Assuming that the direction of a line segment inclined with respect to the irradiation direction P is an inclination direction Q in the tip end side portion of each shape indicating the sign 10, an angle R formed by the inclination direction Q with respect to the irradiation direction P may be less than 120 degree. When the angle R is set to less than 120 degree, the tip end side portion of each shape is easily recognized as an acute-angled shape, and it becomes easy for passengers of other vehicles or pedestrians to assume the planned traveling direction of the vehicle 100. Therefore, a high safety may be secured for the passengers of other vehicles or the pedestrians.

In the vehicle 100, the sign 10 drawn by the light irradiated from the vehicle drawing device 1 on the left side and the sign 10 drawn by the light irradiated from the vehicle drawing device 1 on the right side may have a same shape or may have a different shape.

[Conditions of Light Irradiated from Vehicle Drawing Device]

Subsequently, conditions in the relationship between the light irradiated from the vehicle drawing device 1 and the background luminance will be described (see FIGS. 1 and 5).

When luminance of the sign 10 drawn by the light irradiated from the vehicle drawing device 1 is assumed as road surface drawing luminance $L_o$, and luminance in a surrounding environment of a driving vehicle 100 is assumed as background luminance $L_b$, a luminance contrast C is calculated by Equation 1 below.

$$C = \frac{L_o - L_b}{L_b} \qquad \text{[Equation 1]}$$

Figure 5:
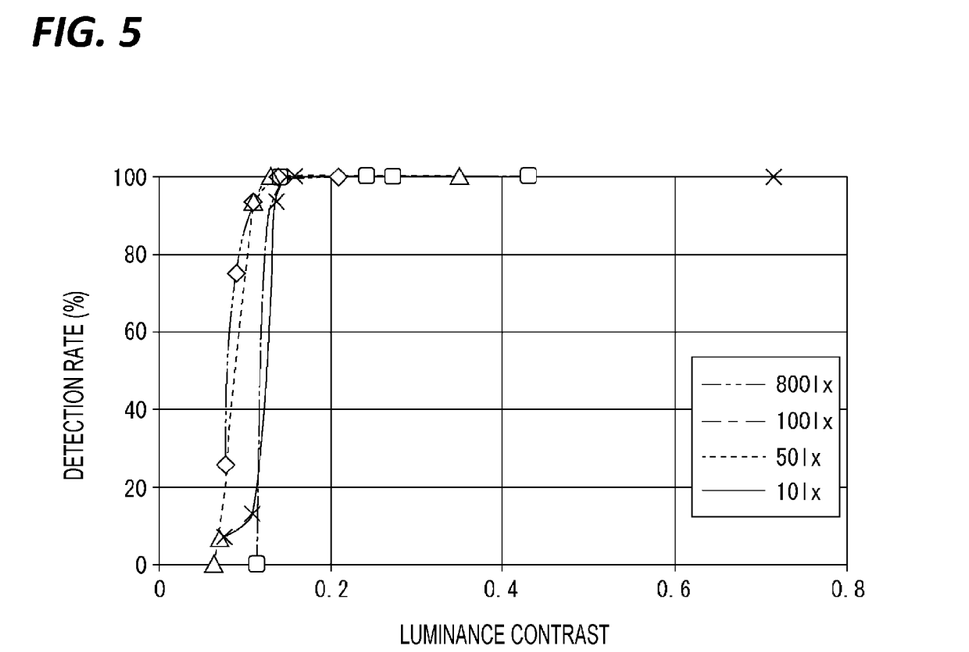
FIG. 5 is a graph illustrating a relationship between a luminance contrast and a detection rate.

FIG. 5 is a drawing illustrating data obtained by measuring a detection rate of the sign by a person with respect to the luminance contrast at background luminances different from each other, when the sign is drawn on the road surface. The horizontal axis indicates the luminance contrast, and the vertical axis indicates the detection rate. The measurement is performed at four different background luminances of 800 lx (lux), 100 lx, 50 lx, and 10 lx. The background luminance of 800 lx is background luminance in the environment immediately before sunset, the background luminance of 100 lx is background luminance in the environment immediately after sunset, the background luminance of 50 lx is background luminance in the environment of a bright intersection at night, and the background luminance of 10 lx is background luminance in the environment of a dark intersection at night.

As illustrated in FIG. 5, at any background luminance, the detection rate becomes 100% when the luminance contrast is 0.2 or more, and thus, the result showing that all persons such as passengers of other vehicles or pedestrians can detect the sign was obtained.

Therefore, the vehicle drawing device 1 is configured such that amber-colored light is irradiated so that the luminance contrast C calculated by the road surface drawing luminance $L_o$ and the background luminance $L_b$ becomes 0.2 or more. Specifically, in the vehicle drawing device 1, the luminous intensity at which the luminance contrast becomes 0.2 or more is defined as follows.

When the luminous intensity of the light irradiated from the vehicle drawing device 1 is assumed as luminous intensity I, in the relationship (see FIG. 1) among the height h of the mounting position of the vehicle drawing device 1 in the vehicle 100, the irradiation distance d of the light, and the angle θ between the irradiation position at the irradiation distance d and the road surface 200, the illuminance $E_{drw}$ of the sign drawn on the road surface (horizontal illuminance) is calculated by Equation 2 below.

$$E_{drw} = \frac{I}{d^2 + h^2} \times \sin\theta = \frac{I}{d^2 + h^2} \times \frac{h}{\sqrt{d^2 + h^2}} = \frac{I \times h}{(d^2 + h^2)^{\frac{3}{2}}} \quad \text{[Equation 2]}$$

Since the luminance and the illuminance are proportional, the luminance contrast C matches the contrast in the illuminance of the road surface, and the ratio calculated by Equation 3 between the horizontal illuminance $E_{drw}$ and an environmental illuminance $E_{env}$ which is the illuminance in the surrounding environment of the driving vehicle 100 matches the luminance contrast C.

$$\frac{(E_{env} + E_{drw}) - E_{env}}{E_{env}} = \frac{E_{drw}}{E_{env}} \quad \text{[Equation 3]}$$

Therefore, when "$E_{drw}/E_{env}$" calculated from Equation 3 becomes 0.2 or more, the value of the luminance contrast C also becomes 0.2 or more, and the detection rate becomes 100% at any background luminance illustrated in FIG. 5, and thus, all persons such as passengers of other vehicles or pedestrians can detect the sign 10.

As indicated by Equation 2, since the horizontal illuminance $E_d$, is a value calculated based on the luminous intensity I, the height h, the irradiation distance d, and the angle θ, the vehicle drawing device 1 is configured such that the luminous intensity I is determined based on the height h, the irradiation distance d, the angle θ, and the required horizontal illuminance $E_{drw}$ depending on the environmental illuminance $E_{env}$, so that the amber-colored light having a predetermined luminous intensity that makes "$E_{drw}/E_{env}$" (=luminance contrast C) to be 0.2 or more is irradiated toward the road surface.

In this case, for example, when the surrounding environment is 800 lx, which is the brightest situation in the measurement data, the luminous intensity that makes the luminance contrast to be 0.2 or more is determined, and light having the luminous intensity equal to or higher than the luminous intensity determined in the situation of 800 lx is irradiated from the vehicle drawing device 1. Therefore, the luminance contrast can be set to 0.2 or more at any environment of 10 lx to 800 lx.

The vehicle 100 may be configured such that a detection camera that detects the luminance of the road surface 200 is provided so as to irradiate the light having the luminous intensity making the luminance contrast to be 0.2 or more from the vehicle drawing device 1 based on the luminance of the road surface 200 detected by the detection camera.

Further, the vehicle 100 may be configured such that an illuminance sensor that detects the environmental illuminance is provided so as to irradiate the light having the luminous intensity making the luminance contrast to be 0.2 or more from the vehicle drawing device 1 based on the environmental illuminance detected by the illuminance sensor.

Further, when a wiper is operated in a case of rain, or when the detection camera detects that the road surface is submerged, there is a concern that dazzling light may be generated to passengers of other vehicles or pedestrians by the light irradiated from the vehicle drawing device 1. However, in such a situation, a dimming control for the light irradiated from the vehicle drawing device 1 may be performed to suppress the generation of the dazzling light.

The luminance contrast may be 0.2 or more. However, it is desirable that the luminous intensity of the light irradiated from the vehicle drawing device 1 is small in order to reduce the amount of light, and the luminance contrast may be less than 1.0, and moreover, may be 0.9 or less.

As described above, in the vehicle drawing device 1, amber-colored light is irradiated such that the luminance contrast C calculated by the road surface drawing luminance $L_o$ and the background luminance $L_b$ becomes 0.2 or more.

Therefore, since the luminance contrast C of the road surface drawing luminance $L_o$ with respect to the background luminance $L_b$ increases, the visibility of the sign 10 drawn on the road surface 200 may be improved, and a high alerting function may be exerted to passengers of other vehicles or pedestrians.

Further, the ON/OFF of the turn signal lamp and the ON/OFF of the vehicle drawing device 1 are performed at the same timing by performing the ON/OFF of the vehicle drawing device 1 at the same timing as the ON/OFF of the turn signal lamp.

Therefore, it becomes easier for passengers of other vehicles or pedestrians to recognize the presence of the vehicle 100 having the vehicle drawing device 1, and thus, it is possible to further improve the alerting function to the passengers of other vehicles or pedestrians.

Further, the amber-colored light is irradiated such that the luminance contrast is less than 1.0, moreover 0.9 or less, and thus, the luminance contrast has a value below a certain level. Therefore, the amount of light irradiated from the vehicle drawing device 1 toward the road surface 200 is decreased, and thus, it is possible to improve the alerting function to passengers of other vehicles or pedestrians while reducing the power consumption.

In the vehicle drawing device 1, the luminance contrast when light that draws at least one sign 10 among lights that draw the signs 10, 10, . . . is irradiated may be 0.2 or more.

With this configuration, the visibility of at least one sign 10 is increased, and thus, it is possible to improve the alerting function to passengers of other vehicles or pedestrians while considering the reduction in the amount of the light irradiated from the vehicle drawing device 1.

[Other Conditions of Light Irradiated from Vehicle Drawing Device]

Subsequently, conditions in the relationship between the light irradiated from the vehicle drawing device 1 and the turn signal lamp will be described (see FIG. 6).

Figure 6:
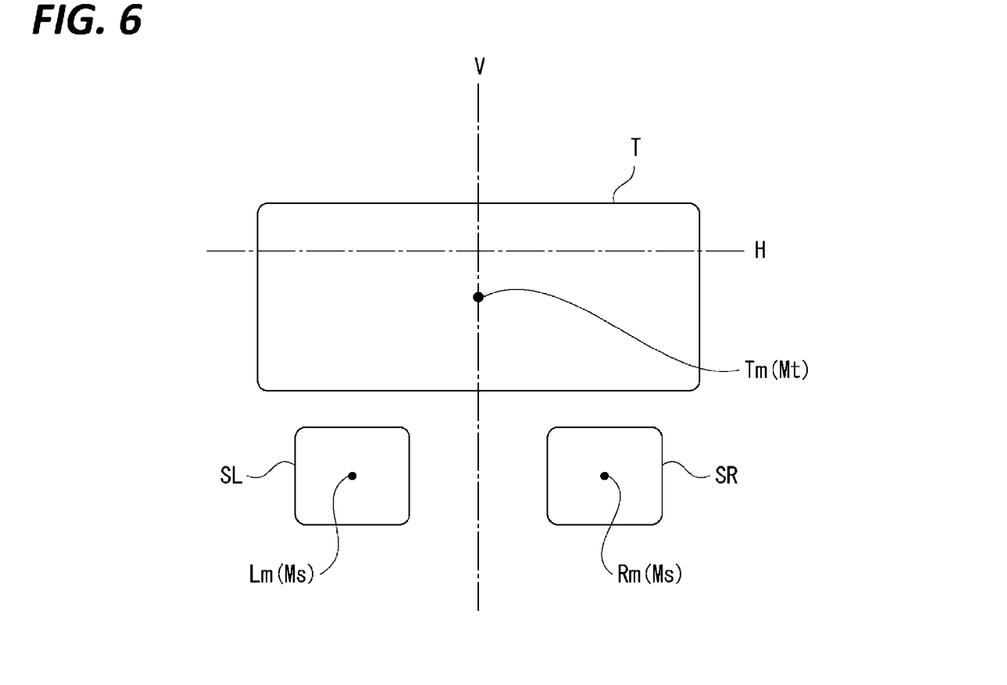
FIG. 6 is a schematic view illustrating a light distribution pattern of light irradiated from a turn signal lamp and light irradiated from the vehicle drawing device.

FIG. 6 is a drawing schematically illustrating a light distribution pattern T of the light irradiated from the turn signal lamp provided in the front end portion of the vehicle 100, a light distribution pattern SL of the light irradiated from the vehicle drawing device 1 on the left side, and a light distribution pattern SR of the light irradiated from the vehicle drawing device 1 on the right side. In FIG. 6, a reference numeral V indicates a vertical line, a reference numeral H indicates a horizontal line when viewed from the driver of the vehicle 100, a reference numeral Tm indicates a center point of the light distribution pattern T, a reference numeral Lm indicates a center point of the light distribution pattern SL, and a reference numeral Rm indicates a center point of the light distribution pattern SR.

As illustrated in FIG. 6, the area from the front side to the side of the vehicle 100 is irradiated with the light emitted from the turn signal lamp provided at the front end portion of the vehicle 100. Meanwhile, the light irradiated from the vehicle drawing device 1 is directed to the area below the light distribution pattern T. At this time, the optical axis of the vehicle drawing device 1 is configured to be inclined downward with respect to the optical axis of the turn signal lamp by 5 degree or more. Further, light is irradiated from the vehicle drawing device 1 on the left side in the front-rear direction toward a range in the left side direction inclined, for example, from 10 degree to 45 degree, and light is irradiated from the vehicle drawing device 1 on the right side in the front-rear direction toward a range in the right side direction inclined, for example, from 10 degree to 45 degree.

In this manner, the optical axis of the vehicle drawing device 1 is inclined downward with respect to the optical axis of the turn signal lamp by 5 degree, and light is irradiated from the vehicle drawing devices 1 and 1 on the left and right sides in the front-rear direction toward the ranges in the lateral side inclined from 10 degree to 45 degree. Therefore, it is possible to draw the signs 10, 10, . . . on the road surface 200 in the vicinity of the vehicle 100.

Therefore, in addition to the passenger of the two-wheeled vehicle 30 or the pedestrian 40 present on the side of the vehicle 100, it is possible for passengers of other vehicles driving on the adjacent lane to recognize the signs 10, 10, . . . . Therefore, it is possible to secure a high alerting function for passengers of other vehicles or pedestrians.

Further, by configuring such that the optical axis of the vehicle drawing device 1 is inclined downward with respect to the optical axis of the turn signal lamp by 5 degree or more, it is possible to irradiate light from the vehicle drawing device 1 to the area outside the irradiation area of the headlamp of the vehicle 100. Therefore, it is possible to further improve the visibility of the signs 10, 10, . . . .

The light irradiated from the turn signal lamp has a maximum luminous intensity MT at the center point Tm of the light distribution pattern T, the light irradiated from the vehicle drawing device 1 on the left side has a maximum luminous intensity Ms at the center point Lm of the light distribution pattern SL, and the light irradiated from the vehicle drawing device 1 on the right side has a maximum luminous intensity Ms at the center point Rm of the light distribution pattern SR.

In the vehicle 100, with respect to the relationship between the maximum luminous intensity Mt and the maximum luminous intensity Ms, the maximum luminous intensity Ms is three times or more of the maximum luminous intensity Mt. The maximum luminous intensity Ms is three times or more the maximum luminous intensity Mt, but may be 20 times or less the maximum luminous intensity Mt in consideration of the reduction in the amount of the light irradiated from the vehicle drawing device 1.

For example, when the maximum luminous intensity Ms of the light irradiated from the vehicle drawing device 1 is 1,500 cd, the maximum luminous intensity Mt of the light irradiated from the turn signal lamp is 500 cd, that is, when the maximum luminous intensity Ms is three times of the maximum luminous intensity Mt, and when assuming that the height h of the mounting position of the vehicle drawing device 1 with respect to the vehicle 100 is 0.7 m, and the irradiation distance d of the light irradiated from the vehicle drawing device 1 is 3.0 m, the luminance contrast C becomes 0.2 or more in the case where the environmental illuminance $E_{env}$ is 1,941 lx or less.

In this manner, by setting the maximum luminous intensity Ms to be three times or more of the maximum luminous intensity Mt, it is possible to secure a sufficiently high luminance contrast in the environmental illuminance of 800 lx or less.

As described above, in the vehicle drawing device 1, the maximum luminous intensity Ms in the light distribution pattern SL and the light distribution pattern SR is three times or more of the maximum luminous intensity Mt in the light distribution pattern T of the light irradiated from the turn signal lamp.

Therefore, since it is possible to increase the luminance contrast C of the road surface drawing luminance $L_o$ with respect to the background luminance $L_b$, the visibility of the sign 10 drawn on the road surface 200 may be improved, and a high alerting function may be exerted to passengers of other vehicles or the pedestrians.

Further, the ON/OFF of the turn signal lamp and the ON/OFF of the vehicle drawing device 1 are performed at the same timing by performing the ON/OFF of the vehicle drawing device 1 at the same timing as the ON/OFF of the turn signal lamp.

Therefore, it becomes easier for passengers of other vehicles or pedestrians to recognize the presence of the vehicle 100 having the vehicle drawing device 1, and thus, it is possible to further improve the alerting function to the passengers of other vehicles or pedestrians.

In the vehicle drawing device 1, the maximum luminous intensity Ms in the light distribution pattern SL or SR of the light that draws at least one sign 10 among lights that draw the signs 10, 10, . . . may be three times or more of the maximum luminous intensity Mt in the light distribution pattern T of the light irradiated from the turn signal lamp.

With this configuration, since it is possible to make the luminance contrast 0.2 or more with respect to the light that draws at least one sign 10, the visibility of at least one sign 10 is increased, and thus, it is possible to improve the alerting function to passengers of other vehicles or pedestrians while considering the reduction in the amount of the light irradiated from the vehicle drawing device 1.

DESCRIPTION OF SYMBOLS

1: vehicle drawing device
10: sign
100: vehicle
200: road surface

What is claimed is:

1. A vehicle drawing device that draws a sign on a road surface with amber-colored light,
   wherein, when a luminance of the sign is assumed as a road surface drawing luminance, and a luminance in a surrounding environment of a driving vehicle is assumed as a background luminance, the amber-colored light is irradiated such that a luminance contrast calculated by the road surface drawing luminance and the background luminance is 0.2 or more, and
   wherein an angle formed by an inclination direction at a tip end of the sign with respect to an irradiation direction of the amber-colored light is less than 120 degrees.

2. The vehicle drawing device according to claim 1, wherein an ON/OFF of the vehicle drawing device is performed at a same timing as an ON/OFF of a turn signal lamp.

3. The vehicle drawing device according to claim 1, wherein the amber-colored light is irradiated such that the luminance contrast is less than 1.0.

4. A vehicle drawing device that draws a sign on a road surface with amber-colored light,
   wherein a maximum luminous intensity in a light distribution pattern of light irradiated from the vehicle drawing device is three times or more of a maximum luminous intensity in a light distribution pattern of light irradiated from a turn signal lamp, and
   wherein an angle formed by an inclination direction at a tip end of the sign with respect to an irradiation direction of the amber-colored light is less than 120 degrees.

5. The vehicle drawing device according to claim 4, wherein an ON/OFF of the vehicle drawing device is performed at a same timing as an ON/OFF of the turn signal lamp.

6. The vehicle drawing device according to claim 4, wherein a plurality of signs is drawn, and
   a maximum luminous intensity in a light distribution pattern of light that draws at least one sign among lights that draw the plurality of signs is three times or more of the maximum luminous intensity in the light distribution pattern of the light irradiated from the turn signal lamp.

7. The vehicle drawing device according to claim 4, wherein the maximum luminous intensity in the light distribution pattern of light irradiated from the vehicle drawing device is twenty times or less of the maximum luminous intensity in the light distribution pattern of light irradiated from the turn signal lamp.

* * * * *